(12) United States Patent
Law et al.

(10) Patent No.: US 8,528,795 B2
(45) Date of Patent: Sep. 10, 2013

(54) LIQUID DOSING DEVICES

(75) Inventors: Brian Robert Law, Leicester (GB);
Jeffrey William Spencer, Leicester Forest East (GB); David John Pritchett, Ashby de la Zouch (GB)

(73) Assignee: Rieke Corporation, Auburn, IN (US)

( * ) Notice: Subject to any disclaimer, the term of this patent is extended or adjusted under 35 U.S.C. 154(b) by 164 days.

(21) Appl. No.: 13/036,252

(22) Filed: Feb. 28, 2011

(65) Prior Publication Data

US 2011/0198371 A1 Aug. 18, 2011

Related U.S. Application Data

(63) Continuation of application No. PCT/GB2009/002106, filed on Sep. 1, 2009.

(30) Foreign Application Priority Data

Sep. 1, 2008 (GB) .................................. 0815881.8

(51) Int. Cl.
*B65D 47/00* (2006.01)

(52) U.S. Cl.
USPC .......................................... 222/477; 222/494

(58) Field of Classification Search
USPC .................. 222/477, 494, 490–491, 212–215; 251/85, 170; 277/349, 376, 905, 910
See application file for complete search history.

(56) References Cited

U.S. PATENT DOCUMENTS

| | | | |
|---|---|---|---|
| 2,774,517 A | 12/1956 | Teegardin et al. | |
| 2,919,056 A * | 12/1959 | Collins | 222/477 |
| 3,379,136 A | 4/1968 | Corsette | |
| 4,118,152 A | 10/1978 | Bron | |
| 4,277,001 A | 7/1981 | Nozawa | |
| 4,286,736 A | 9/1981 | Corsette | |

(Continued)

FOREIGN PATENT DOCUMENTS

| | | |
|---|---|---|
| DE | 39 29 064 A | 1/1991 |
| EP | 0 098 939 A2 | 1/1984 |

(Continued)

OTHER PUBLICATIONS

European Patent Application 04255318 Search Report mailed Jun. 14, 2006.

(Continued)

*Primary Examiner* — Kevin P Shaver
*Assistant Examiner* — Michael Melaragno
(74) *Attorney, Agent, or Firm* — Woodard Emhardt Moriarty McNett & Henry LLP

(57) ABSTRACT

A dosing device for dispensing liquid from a container (1) in which flow through flow openings (23) to an outlet tube (44) is blocked after controlled delay by an obturator (3) moveable within a control chamber (2) mounted in a container neck (101) behind the outlet tube (44). Movement of the obturator (3) is governed by restricted flow through control openings (28) at the rear of the control chamber. Restoration of the obturator to the back of the control chamber facilitates repeated dosing. An elastomeric element (6) of resiliently deformable material promotes a seal to achieve a cleanly defined dose. In one proposal the elastomeric element coats the surface of the obturator and/or the outlet tube (64) to cut off the flow. Another proposal provides a one-way elastomeric valve element (63) for blocking the flow openings to enable rapid recovery after a dosing operation.

16 Claims, 2 Drawing Sheets

(56) References Cited

U.S. PATENT DOCUMENTS

| | | | |
|---|---|---|---|
| 4,360,130 A | 11/1982 | Nishimura et al. | |
| 4,364,718 A | 12/1982 | Beun et al. | |
| 4,371,098 A | 2/1983 | Nozawa et al. | |
| 4,589,573 A | 5/1986 | Tada | |
| 4,673,109 A | 6/1987 | Cassia | |
| 4,775,079 A | 10/1988 | Grothoff | |
| 4,776,498 A | 10/1988 | Maerte et al. | |
| 4,811,871 A * | 3/1989 | Wass et al. | 222/477 |
| 4,958,752 A | 9/1990 | Maerte et al. | |
| 5,016,780 A | 5/1991 | Moretti | |
| 5,115,980 A | 5/1992 | Skorka | |
| 5,165,577 A | 11/1992 | Ophardt | |
| 5,282,552 A | 2/1994 | Ophardt | |
| 5,353,969 A | 10/1994 | Balderrama | |
| 5,373,970 A | 12/1994 | Ophardt | |
| 5,401,148 A | 3/1995 | Foster et al. | |
| 5,431,309 A | 7/1995 | Ophardt | |
| 5,445,288 A | 8/1995 | Banks | |
| 5,489,044 A | 2/1996 | Ophardt | |
| 5,548,943 A | 8/1996 | Behar et al. | |
| 5,676,277 A | 10/1997 | Ophardt | |
| 5,738,250 A | 4/1998 | Gillingham et al. | |
| 5,813,576 A | 9/1998 | Iizuka et al. | |
| 5,904,272 A * | 5/1999 | Kaufman et al. | 222/207 |
| 5,975,360 A | 11/1999 | Ophardt | |
| 5,988,456 A | 11/1999 | Laible | |
| 6,045,008 A | 4/2000 | Gonzalez et al. | |
| 6,082,586 A | 7/2000 | Banks | |
| 6,126,042 A | 10/2000 | Meshberg | |
| 6,240,979 B1 | 6/2001 | Lorscheidt | |
| 6,343,724 B1 | 2/2002 | Ophardt et al. | |
| 6,409,050 B1 | 6/2002 | Ophardt et al. | |
| 6,516,976 B2 | 2/2003 | Lewis et al. | |
| 6,533,145 B2 | 3/2003 | Lewis et al. | |
| 6,540,117 B2 | 4/2003 | Powling | |
| 6,540,157 B2 | 4/2003 | Ophardt | |
| 6,543,651 B2 | 4/2003 | Lewis et al. | |
| 6,557,736 B1 | 5/2003 | Ophardt | |
| 6,575,334 B2 | 6/2003 | Lewis et al. | |
| 6,575,335 B2 | 6/2003 | Lewis et al. | |
| 6,601,736 B2 | 8/2003 | Ophardt et al. | |
| 7,004,356 B1 | 2/2006 | Sayers | |
| 7,011,237 B1 | 3/2006 | Sayers et al. | |
| 7,104,426 B2 * | 9/2006 | Suzuki | 222/209 |
| 7,325,704 B2 | 2/2008 | Kasting | |
| 7,367,476 B2 | 5/2008 | Law et al. | |
| 7,461,762 B2 | 12/2008 | Law et al. | |
| 7,654,418 B2 | 2/2010 | Law et al. | |
| 7,690,535 B2 | 4/2010 | Law et al. | |
| 7,891,522 B2 | 2/2011 | Law et al. | |
| 2002/0027144 A1 | 3/2002 | Lacout | |
| 2003/0132252 A1 | 7/2003 | Rossignol | |
| 2003/0201286 A1 | 10/2003 | Ophardt | |
| 2004/0217137 A1 | 11/2004 | Ophardt | |
| 2005/0051579 A1 | 3/2005 | Kasting | |
| 2006/0043117 A1 | 3/2006 | Law et al. | |
| 2007/0215643 A1 | 9/2007 | Law et al. | |
| 2008/0197149 A1 | 8/2008 | Law et al. | |
| 2008/0308183 A1 | 12/2008 | Law | |
| 2009/0212074 A1 | 8/2009 | Brouwer | |
| 2010/0276515 A1 | 11/2010 | Milanese | |
| 2012/0097714 A1 * | 4/2012 | Hoefte et al. | 222/477 |

FOREIGN PATENT DOCUMENTS

| | | |
|---|---|---|
| EP | 0 274 256 A1 | 7/1988 |
| EP | 0 389 688 A2 | 10/1990 |
| EP | 0 600 286 A2 | 6/1994 |
| EP | 0 703 831 B1 | 12/1998 |
| EP | 1 092 447 A2 | 4/2001 |
| EP | 1 190 775 A1 | 3/2002 |
| EP | 1 015 341 B1 | 1/2004 |
| EP | 1 449 595 A1 | 8/2004 |
| EP | 1 514 607 A2 | 3/2005 |
| EP | 1 629 900 A2 | 3/2006 |
| EP | 1 671 705 A1 | 6/2006 |
| EP | 1 676 640 A1 | 7/2006 |
| EP | 2 095 882 A1 | 9/2009 |
| EP | 2 133 153 A1 | 12/2009 |
| EP | 2 153 908 A1 | 2/2010 |
| GB | 1149805 | 4/1969 |
| GB | 2 360 273 A | 9/2001 |
| GB | 2360273 A * | 9/2001 |
| JP | H08-011921 A | 1/1996 |
| WO | WO 99/49769 A1 | 10/1999 |
| WO | 03/101620 A1 | 12/2003 |
| WO | WO 2005/049477 A2 | 6/2005 |
| WO | WO 2005049477 A2 * | 6/2005 |
| WO | WO 2010023462 A1 * | 3/2010 |

OTHER PUBLICATIONS

European Patent Application 05256914.2 Extended Search Report mailed Mar. 2, 2006.

European Search Report in corresponding EP 11250032.7 dated May 20, 2011.

Hygiene-Technik Inc., A member of the Ophardt Group of Companies, UX10 Lotion or Foam Soap Dispenser, 2004, pp. 2.

PCT/GB2011/001001 Search Report and Written Opinion dated Nov. 24, 2011.

PCT/GB2011/001002 Search Report and Written Opinion dated Sep. 26, 2011.

Pictures of Umbrella Valve from RD Industries of Omaha, Nebraska (Pictures 1-6), Jan. 4, 2005.

United Kingdom Patent Application 1100129.4 Search Report mailed Mar. 23, 2011.

* cited by examiner

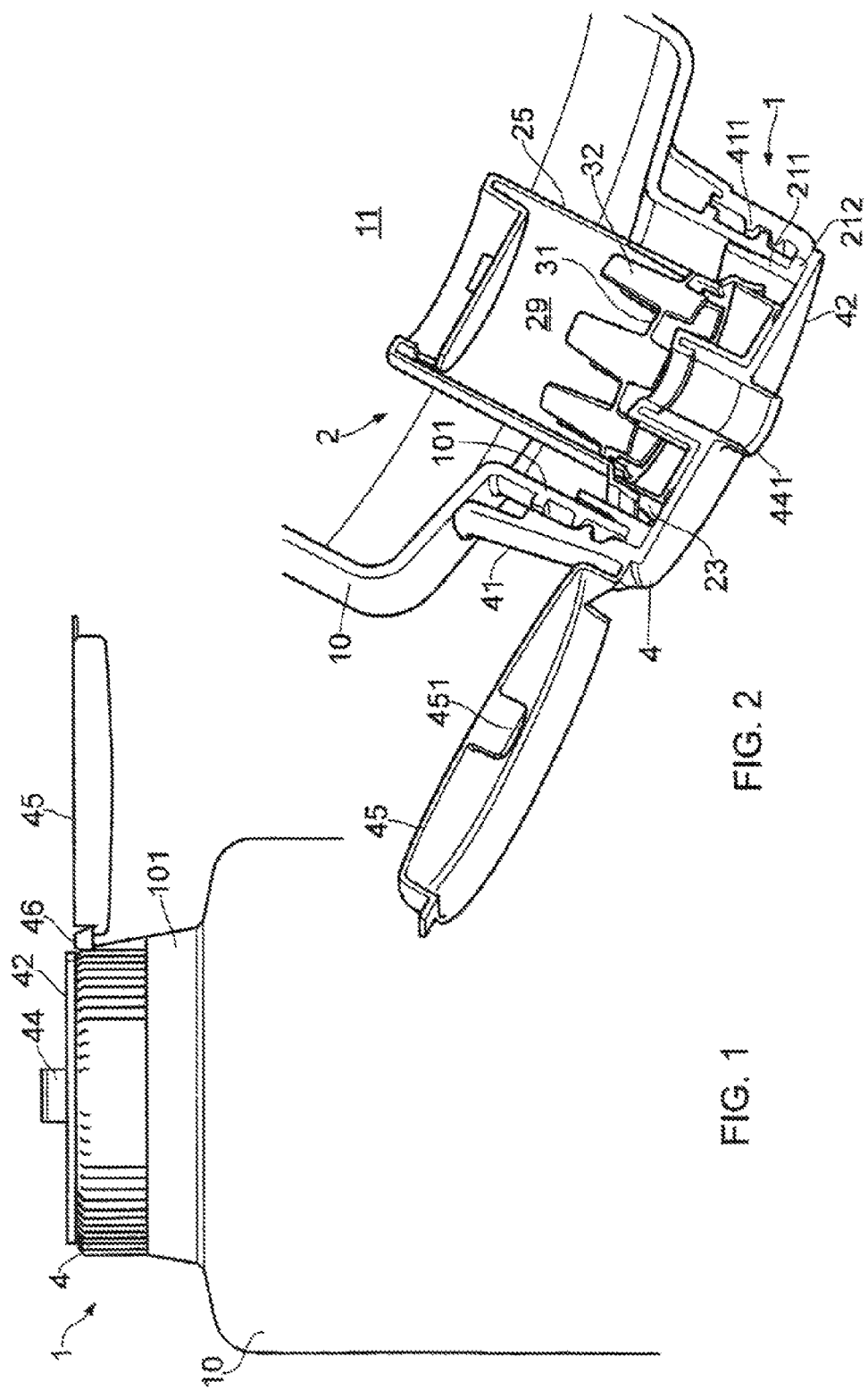

LIQUID DOSING DEVICES

CROSS REFERENCES TO RELATED APPLICATIONS

This application is a continuation of International Application PCT/GB2009/002106, filed Sep. 1, 2009, which claims the benefit of Great Britain Application No. 0815881.8, filed Sep. 1, 2008, the entire disclosures of which are hereby incorporated by reference.

BACKGROUND OF THE INVENTION

This invention has to do with devices adapted for dispensing metered doses of liquid from a container, and containers incorporating such devices, and methods of using them. In preferred embodiments the devices are used in, or adapted for use in, squeezable containers, especially resiliently-shape-recovering squeezable containers. A preferred field of use is that of containers for domestic or household use, containing detergents or other cleaning preparations, fabric conditioners, or liquid foods such as sauces.

Particularly, the invention is concerned with liquid dosing devices of a known kind (referred to below as "the kind described") having an outlet passage leading to a front discharge opening, past or around a control chamber positioned behind the front discharge opening and having one or more rear control openings to admit a restricted flow of liquid from the container interior into the control chamber. An obturator such as a sliding piston is movable in the control chamber and adapted to advance, during dispensing, under the influence of liquid flowing into the control chamber behind it through the control opening(s). When the obturator has advanced sufficiently it blocks the outlet passage to terminate the dose. Usually the outlet path of the liquid leads from the container interior forwardly past outside the control chamber and then radially inwardly, around (or through) the front peripheral part of the control chamber wall, to in front of the obturator and to the discharge opening. This front part of the chamber wall may have one or more circumferentially-distributed flow openings for this purpose. The discharge opening is typically axial or central at the front of the device. The part of the passage leading immediately to it is desirably defined by a tubular extension, projecting rearwardly towards the obturator and providing a seat against which the front of the obturator rests to block the passage.

See for example our EP-A-0274256 describing how the outside of the tubular extension can also serve to guide the liquid flow rearwardly towards the obturator piston to control its rate of advance.

Devices of the kind described have an advantage, compared with dispensers using a metering chamber adjacent the container mouth, in that the volume dispensed is not swept out or held in the dosing device itself. It is possible to achieve a large dose without a large device.

However there are issues with speed and convenience. Obturators may be slow to recover position, and the dispenser needs to be returned to an upright position to create a new dose or restart the mechanism.

Our WO2005/049477 has two proposals addressing such issues.

One proposal provides a dump valve arrangement at the back of the control chamber. Such a dump valve—also discussed in one version in EP-A-0274256—is operable to close during dispensing—under gravity and/or forward fluid pressure—so that liquid enters the control chamber only through the control opening(s). The dump valve opens after dispensing—under gravity and/or reverse fluid pressure—so that liquid can escape from the control chamber more rapidly than if the only escape route were through the control opening(s).

The second proposal of WO2005/049477, implemented with a resiliently squeezable container, provides a unidirectional valve inhibiting reverse flow in the outlet passage upstream of the obturator's blocking position. On recovery of shape of the container after squeezing out a dose, the movable element of the valve—disclosed as a free annulus or a radial flap—is urged onto its seat by the reverse fluid pressure and prevents liquid from returning to the container interior by way of the outlet passage. Instead it flows back into the container from the control chamber space behind the obturator i.e. through the control opening(s), and/or dump valve opening if present. This speeds return of the obturator to its retracted position so that another dose can be dispensed, and desirably can clear the control chamber and re-initiate the obturator even while the container is inverted (typically, with the front of the dosing device and the discharge opening facing down). Repeated doses can then be dispensed without needing to right the container between doses. The forced retraction of the obturator also draws liquid back out of the discharge opening area (nozzle tube), reducing dripping after dispensing.

We have found that these previous proposals still leave something to be desired in dispensing performance in respect of clean termination of the dose, and in respect of repeated dosing while inverted. The present proposals address these issues independently and in combination, as well as (in preferred embodiments) providing convenient manufacturing solutions for the components concerned.

A first aspect of the present proposals relates to the blocking of flow by the obturator. In a device of the kind described, a surface of the device defining a part of the outlet passage in front of the obturator presents a rearwardly-directed seat, surrounding the outlet passage and engageable by a blocking portion at the front of the obturator in its advanced position, around an annular engagement region, so as to block the outlet passage as mentioned previously. The proposal is that one or both of the surfaces of the obturator and seat comprises a resiliently deformable sealing material, preferably elastomer material, at least around the respective annular engagement region thereof.

By this means we find that we can achieve a marked improvement in dosing performance, so that at the end of a dose, the flow through the discharge opening is cut off suddenly and completely with little or no subsequent dripping.

The seat against which the obturator seals is preferably the annular periphery of a rearwardly-extending tubular formation, typically a cylindrical formation. The corresponding blocking portion of the obturator may be a substantially flat surface, e.g. a substantially flat piston front face. This minimises the contact area and maximises the perpendicularity of the contact surface to the contact movement, reducing wedging and sticking. Desirably the obturator and tubular outlet formation are of relatively rigid plastics material, a the resiliently deformable (elastomeric) material for the seal being provided as a surface covering on one or both of these. We particularly prefer an elastomeric element forming an annulus around the rear edge of a tubular outlet formation, connected by some suitable means (or coated) onto the underlying plastics material of the tubular formation. Desirably the elastomeric element is or includes an annular part with a forwardly-directed annular recess or channel fitting onto the rearwardly-directed annular periphery of the tubular outlet formation.

The resiliently deformable component may be attached to the tubular outlet formation by any suitable means, e.g. interference fit, adhesive, interlock formation or integral moulding such as "two shot" moulding, perhaps with form interlock.

In one preferred embodiment a sleeve of elastomeric covering extends forwardly from the sealing seat, around the tubular outlet formation, to where this formation meets the radially-extending front web of a container closure in which the device is comprised, and the elastomeric member there desirably extends out radially from the sleeve across this web. This radial extension portion may optionally be trapped by engagement by other members of the device, or between the container neck and part of the device, for additional security.

A second aspect of our proposals relates to the feature of a unidirectional anti-reverse valve in the outlet passage, an idea disclosed as such in WO2005/049477. In the present second aspect we provide a unidirectional valve of this type which is resiliently biased against the corresponding seat portion(s), i.e. towards the closed condition. Desirably, this is by means of the valve comprising a flap member of elastomeric material, such as a rubber or thermoplastic elastomer (TPE). The elastomeric valve element may be deformed relative to its free shape when assembled into the device, so that the flap thereof is biased against its counter-surface.

The advantage of this is as follows. As in the proposal of WO2005/049477 above, it prevents reverse flow along the outlet passage when the container—which may still be inverted—recovers its volume after dispensing a dose. This speeds retraction of the obturator, and may enable dispensing of two or more doses without righting the container in between. Additionally, however, the resilient bias of the sealing element to its closed condition resists pressure from the body of liquid in the container when the container is inverted. Dimensions, material and initial bias deformation of the sealing element may be selected so that it will open the outer passage only when a predetermined threshold pressure, corresponding for example to a typical static pressure head associated with a container full of the intended liquid product in the inverted container, is exceeded e.g. by a pressure corresponding to a typical vigorous manual squeeze of the inverted container. Moreover by this simple expedient the valve element takes on the additional function of preventing unwanted preliminary dripping or trickling from the container if there is a delay between inverting it and squeezing it.

As with the first aspect, therefore, the second aspect contributes to achieving a cleanly-defined dose and it is desirable to combine the two aspects of the proposals.

Moreover, since each of the two aspects is preferably embodied using an elastomeric element—a static seal element and a valve flap element respectively—a particularly preferred embodiment of our proposal combines these into a single elastomeric element. It may comprise a central annulus forming the seal on the rear edge of a tubular outlet formation and, radially spaced outwardly therefrom, an integral flap formation (e.g. a continuous annulus, or segment(s) corresponding to one or more circumferentially-localised flow openings) which spans the corresponding portion of the outlet passage.

Desirably the valve operates adjacent (at, adjacent or through) a front periphery of the control chamber and has a sealing edge engageable with a component bounding the outer passage at that point so that in its rest condition it blocks the outer passage at that position.

There may be plural flow openings, e.g. circumferentially distributed between formations which support the control chamber component. These may be controlled by respective portions or segments of the mentioned valve member, or more conveniently by a continuous annular valve flap since this need not be rotationally aligned during assembly.

In a preferred embodiment the valve flap projects generally rearwardly, and is biased radially outwardly against a corresponding opposed sealing region, e.g. on the inside of a component which defines a control chamber and also has supporting structure extending forwardly and/or radially outwardly to mount the control chamber in the container neck, with one or more flow openings at the front of this structure.

The elastomeric element may therefore conveniently comprise a front layer or web with a central rearward sleeve carrying the seal and, spaced radially outwardly from it, one or more rearwardly-projecting sealing skirts constituting the valve flap(s). Such a valve flap may be outwardly radially divergent at least in its free condition. Optionally also a further radially outwardly extending portion of the front web or layer is provided, to be trapped between components of the container closure to hold the elastomeric element securely in position.

By these means, a device otherwise corresponding substantially to the known devices can readily be adapted to significantly improve its dosing performance, reducing dripping or leakage both before and after each dose and/or enabling repeated dosing in the inverted condition if desired.

In other respects, the general conformation of the closure elements (e.g. control chamber, obturator, cap, container) may be as described in the earlier applications acknowledged previously. The device may be provided on a neck at the top of an invertible container. The discharge opening may be directed upwardly, e.g. vertically upwardly, when the container stands upright on its base. The movement direction of the obturator is desirably generally coaxial with the neck, and desirably generally coaxial with the external discharge opening.

In a preferred version, as mentioned above, the outlet passage begins with substantially the entire space surrounding the control chamber—e.g. through a clearance between this chamber (which is typically cylindrical) and a wider container neck in which it is mounted, preferably coaxially—and leads through or around the front edge of the control chamber via one or more circumferentially-distributed openings so as to provide a suitable cross-section of flow, and then inwardly to a central discharge outlet this outlet having said rearwardly-extending tube formation.

In preferred constructions the control chamber and its connection structure are a single moulded unit, connecting to a front cap component of the device which also comprises integrally (or mounts) the discharge outlet formation, and includes means such as a screw thread or snap ribs for securing it onto/into a container neck opening, with the control chamber projecting back inside the container neck with lateral or radial clearance for the outflow of product past it. Desirably an outer cover cap for the discharge opening is included. The cover cap may include a plug closure for the discharge opening. The cover cap may be integrally hinged to the mentioned front cap component. It will be understood that the main web of the front cap component may provide the rear surface against which the radial web of the preferred elastomeric component may lie.

The form of the obturator is not particularly limited, and all of the general and specific options proposed in EP-A-0 274 256 and WO 2005/049477 are available.

The squeezable container may be of any (e.g. well-known) type, shape and material.

The components of the dosing closure device are typically moulded plastics components, joining by snap, press or screw engagements without requiring discrete fasteners. The device is suitable for implementation in mass-produced containers, e.g. for household products or food products. In this respect, TPE is desirable for use as the elastomeric components because many TPEs have high compatibility with household or indeed food use.

The control chamber may or may not be provided with a dump valve of the type described in our above-mentioned earlier applications for further facilitating emptying of the chamber after dosing.

Examples of the present proposals are now described with reference to the accompanying drawings.

BRIEF SUMMARY

A dosing device for dispensing liquid from a container in which flow through flow openings to an outlet tube is blocked after controlled delay by an obturator moveable within a control chamber mounted in a container neck behind the outlet tube. Movement of the obturator is governed by restricted flow through control openings at the rear of the control chamber. Restoration of the obturator to the back of the control chamber facilitates repeated dosing. An elastomeric element of resiliently deformable material promotes a seal to achieve a cleanly defined dose. In one proposal the elastomeric element coats the surface of the obturator and/or the outlet tube to cut off the flow. Another proposal provides a one-way elastomeric valve element for blocking the flow openings to enable rapid recovery after a dosing operation.

One object of the present disclosure is to describe an improved dosing device for dispensing liquid from a container.

BRIEF DESCRIPTION OF THE SEVERAL VIEWS OF THE DRAWINGS

FIG. 1 is an elevation of the upper part of a squeezable container, showing the external appearance of a dosing device of the present type.

FIG. 2 is an axial section showing the dosing device in an inverted position;

DETAILED DESCRIPTION

Figure 4:
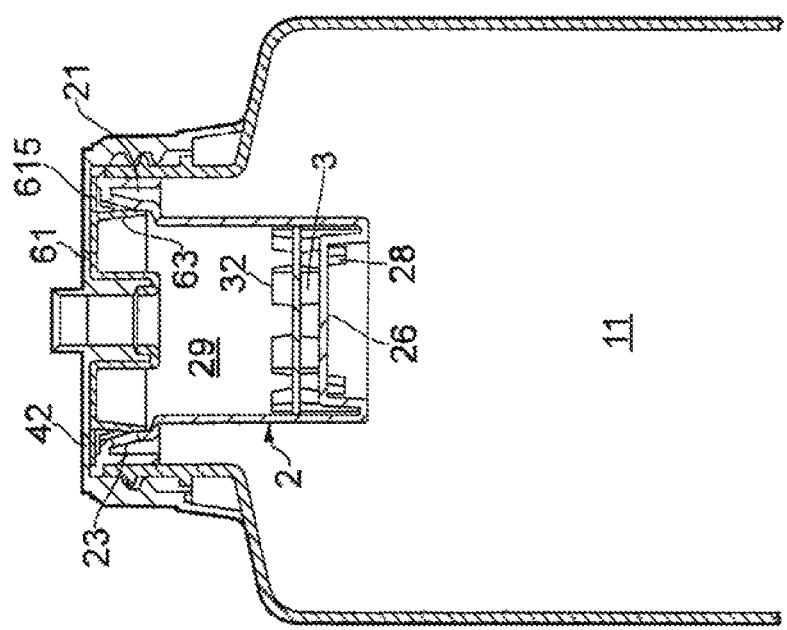
FIG. 4 is an axial section showing a variant construction of the elastomeric insert.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

With reference to FIGS. 1 and 2, a dosing dispenser device 1 fits on the neck of a plastic squeezable container 10. The dosing device 1 has a front cap component 4, being a one-piece moulding providing a front plate 42, a central outlet tube formation 44 with a forwardly projecting nozzle 441 and an outer securing skirt 41 with an internal thread 411 by means of which it fixes onto the container neck 101. An outer cover cap 45 is also provided, joining integrally to the rest of the cap component 4 through an integral butterfly hinge 46 so that the cap 45 is bistable in position, i.e. it tends either to be in fully shut or fully open position as shown. The underside of the cap 45 has an integral nozzle plug 451 which locks the outer nozzle 441 when the cap is shut.

The second major component of the device is a control chamber or insert cylinder component 2. This is moulded from rigid plastics and consists essentially of a closed cylindrical side wall 25 defining an internal control chamber 29, and having around its front edge a connection structure in the form of an integral forward extension 21. The connection structure 21 comprises a continuous outer annulus 211 which plugs into the container neck 101 and has an outward end flange 212 which is trapped between the edge of the container neck and the underside of the cap web 42. Inwardly of this, the front edge of the chamber wall 25 has an outwardly flared portion 213 (seen best in FIG. 3) which in some circumferential regions connects through to the base of the locating ring 211, as seen in the portions indicated in FIG. 4, described later), and at other circumferential regions stops short of the front so that a flow opening 23 is defined. Here there are three equidistant flow openings 23 but this is not critical.

Behind the front plate 42 of the cap 4 the central outlet tube 44 projects rearwardly into the open front end of the control chamber 2. An obturator or control piston 3 is enclosed in the control chamber 29, and has a flat central disc 31 with a set of axially-projecting integrally-formed peripheral guide lugs 32 around its edge. The control piston 3 fits substantially—i.e. occupying nearly all the cross-section without being a tight fit—into the control chamber 29 so as to be freely slidable in it, between a forward position in which its central web surface 31 lies against and blocks the rear entrance to the outlet tube 44 (as seen in FIG. 2) and a rear position in which it lies against the rear wall 26 of the control chamber 2 (as seen in FIG. 4).

The described cap and control chamber may be of polypropylene, and the piston of polyethylene, but other materials may be used.

Thus, the outlet passage for liquid in the container exists from the container's interior space 11 and forwardly through the radial clearance between the control chamber 2 and the container neck 101, forward and in through the flow openings 23 to the space between the cap 4 and the control chamber 2 (and in front of the control piston 3), and finally inwardly through the rear entrance of the outlet tube 44 and out though the discharge nozzle 441.

As described in the earlier applications, the rear wall 26 of the control chamber 2 has a set of small control openings 28.

Figure 3:
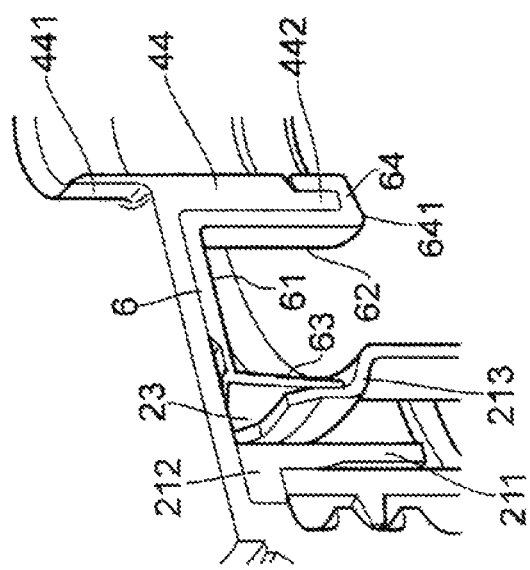
FIG. 3 is an axial cross-sectional detail of the FIG. 2 device, showing operating portions of an elastomeric insert.

Additionally, the dispensing closure comprises a one-piece integral valve and sealing insert 6, shown in one embodiment in FIGS. 2 and 3 and in a slightly variant embodiment in FIG. 4. It may be made of any suitable elastomer for the use in hand, but a polypropylene-based TPE is one suitable material. In the illustrated embodiment, the elastomeric insert comprises a flat base web 61, with a rearward central sleeve 62 extending to an in-turned seal channel portion 64. The sleeve 62 fits closely around the polypropylene outlet tube 44 of the cap. The outlet tube has a rearward edge with reduced thickness 442, and the end of the elastomeric sleeve has a channel which fits over this so that the overall thickness is maintained, with a flush inner diameter. The rearward surface 641 of the elastomer channel constitutes an elastomeric sealing surface against which the web 31 of the piston 3 seals in use.

The rearwardly-projecting sealing lip portion 63 of the elastomeric insert 6 is provided as a continuous annular formation (i.e. extending around the flow openings and also the supporting structures, for simplicity), and projects rearwardly to engage with resilient bias against the internal surface of the flared supporting regions 213 adjacent the flow openings 23.

FIG. 4 shows a variant in which the flat base web 61 of the elastomeric insert continues radially outwardly beyond the root of the sealing lip 63. This outer radial extension 615 is trapped, together with the support structure 21 of the control chamber 2, against the cap web 42 by the threading of the closure onto the container neck. This helps to keep the elastomer component 6 in position and may obviate the use of adhesives in assembly.

In use, the general dosing action is as described above and in WO2005/049477, and need not be repeated here. It will be noted that, while the valve flap 63 is differently disposed and oriented compared with the valve elements disclosed in the earlier application, its ability to prevent reverse flow is similar. However it has the additional property, by virtue of its biased resilient seal, of preventing premature dripping from the device after inversion of the container, before a dose is squeezed out. It has sufficient strength and resilience to withstand the head of liquid in the inverted container, and yields to provide the dispensing action only when the container is squeezed. Moreover, unlike the free valve elements described in the earlier application, it maintains its sealed condition in all orientations and avoids undesirable dripping or leakage in other situations too.

Additionally, the improved sealing engagement between the elastomeric surface 641 of the outlet tube and the front face of the piston web 31 gives an improved cut-off of flow at the end of each dispenser action.

As a result, we find that the illustrated dispensers enable ready dispensing of two, three, four or more successive metered doses without the container needing to be righted from the inverted position.

We prefer that the device is adapted to give a dose size of between 10 and 50 ml, but this will vary from one product to another, and of course will to some extent depend on the viscosity of the product as well as on the selection of components in the dispenser.

The aspects of the invention include the liquid dosing device itself, a closure assembly comprising such a device, a container such as a squeezable container with such a closure assembly fitted onto it, and a dispensing package comprising such a squeezable container, liquid product therein, and the liquid dosing dispenser/closure fitted to it. Further aspects are corresponding methods of dispensing liquid, especially with repeated dosing in the inverted position as described.

The skilled reader will appreciate that the invention is not necessarily limited to the features of the described embodiments and other embodiments may be made and used on the basis of the general teachings herein.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A dosing device for dispensing metered doses of liquid from a container, the device having an outlet passage leading to a front discharge opening past or around a control chamber, which is positioned behind the front discharge opening and has one or more rear control openings to admit a restricted flow of liquid from the container interior into the control chamber, the device further comprising an obturator movable in the control chamber and adapted to advance, during dispensing, under the influence of liquid flowing into the control chamber behind it through said one or more rear control opening, to a blocking position where it blocks the outlet passage to terminate the dose, the device comprising a rearwardly-extending tubular formation defining part of the outlet passage in front of the obturator, said tubular formation having an annular periphery which presents a rearwardly-directed seat, and said device further comprising an annular elastomeric element around the rear edge of said tubular formation, the tubular formation surrounding the outlet passage and being engageable by a blocking portion at the front of the obturator in the blocking position, said annular elastomeric element providing a resiliently deformable sealing material at least around an annular engagement region of the rearwardly-directed seat which engages the obturator in the blocking position.

2. A dosing device according to claim 1 wherein the annular elastomeric element has a forwardly-directed annular recess or channel fitting onto a rearwardly-directed annular periphery of the said tubular formation.

3. A dosing device according to claim 1 in the form of a container closure having a radially-extending front web and wherein the annular elastomeric element comprises a sleeve that extends forwardly from said rearwardly-directed seat to where said tubular formation meets the radially-extending front web of a container closure.

4. A dosing device according to claim 3 wherein the annular elastomeric element comprises a radial extension portion that extends out radially from the sleeve across said radially-extending front web.

5. A dosing device according to claim 1 which further comprises a valve in the outlet passage to prevent reverse flow.

6. A dosing device according to claim 5 wherein the valve comprises a valve flap resiliently biased against a corresponding seat portion.

7. A dosing device according to claim 6 wherein the valve flap is of elastomeric material.

8. A dosing device according to claim 6 wherein the valve flap is a continuous annular valve flap.

9. A dosing device according to claim 6 wherein the valve flap is biased radially outwardly against the inside of a component of said dosing device which defines the control chamber, said component having supporting structure extending forwardly and/or radially outwardly to mount the control chamber in a container neck or closure cap.

10. A dosing device according to claim 6 wherein the valve flap is comprised in said annular elastomeric element.

11. A dosing device according to claim 10 wherein the annular elastomeric element comprises an outer extension portion to be trapped between a container closure and a container neck.

12. A dosing device according to claim 1 in combination with said container wherein said container is resiliently squeezable.

13. A method of dispensing metered doses of liquid from a dosage device and container combination, according to claim 12, the method comprising the following step:
providing the claim 16 structural combination; and
inverting the container to cause the flow of liquid through the outlet passage, with a restricted flow of liquid from the container into the control chamber through said one or more rear control openings in the rear wall of the control chamber, the obturator advancing to the blocking position where it blocks the outlet passage to terminate the dose.

14. A method according to claim 13 in which the container is a squeezable container, the method comprising releasing a squeeze of the container, optionally with the container inverted, to recover the container shape and urge the obturator back to the rear of the control chamber so that another dose can be dispensed.

15. A dosing device for dispensing metered doses of liquid from a container, the device having an outlet passage leading to a front discharge opening past or around a control chamber, which is positioned behind the front discharge opening and has one or more rear control openings to admit a restricted flow of liquid from the container interior into the control chamber, the device further comprising an obturator movable in the control chamber and adapted to advance, during dispensing, under the influence of liquid flowing into the control chamber behind it through the one or more rear control openings, to a blocking position where it blocks the outlet passage to terminate the dose, the device comprising a radially-extending front web of a container closure and a rearwardly-extending tubular formation which defines part of the outlet passage in front of the obturator, said tubular formation having an annular periphery which presents a rearwardly-directed seat, surrounding the outlet passage and being engageable by a blocking portion at the front of the obturator in the blocking position, wherein the surface of the rearwardly-directed seat comprises a resiliently deformable sealing material at least around an annular engagement region thereof, and wherein the resiliently deformable sealing material forms a sleeve that extends forwardly from the rearwardly-directed seat to where the rearwardly-extending tubular formation meets said radially-extending front web.

16. A dosing device for dispensing metered doses of liquid from a container, the device having an outlet passage leading to a front discharge opening past or around a control chamber, which is positioned behind the front discharge opening and has one or more rear control openings to admit a restricted flow of liquid from the container interior into the control chamber, the device further comprising an obturator movable in the control chamber and adapted to advance, during dispensing, under the influence of liquid flowing into the control chamber behind it through the one or more rear control openings, to a blocking position where it blocks the outlet passage to terminate the dose, a surface of the device defining part of the outlet passage in front of the obturator presenting a rearwardly-directed seat, which surrounds the outlet passage and is engageable by a blocking portion at the front of the obturator in the blocking position, wherein the surface of the rearwardly-directed seat comprises a resiliently deformable sealing material at least around an annular engagement region thereof; and the dosing device further comprising a valve in the outlet passage to prevent reverse flow, said valve comprising a valve flap resiliently biased against a corresponding seat portion, and said resiliently deformable sealing material and said valve flap being comprised in a single elastomeric element.

* * * * *

UNITED STATES PATENT AND TRADEMARK OFFICE
CERTIFICATE OF CORRECTION

| | | |
|---|---|---|
| PATENT NO. | : 8,528,795 B2 | Page 1 of 1 |
| APPLICATION NO. | : 13/036252 | |
| DATED | : September 10, 2013 | |
| INVENTOR(S) | : Brian Robert Law | |

It is certified that error appears in the above-identified patent and that said Letters Patent is hereby corrected as shown below:

In the Claims

In column 8, line 17, please delete the word --the--.

Signed and Sealed this
Twenty-fifth Day of February, 2014

Michelle K. Lee
*Deputy Director of the United States Patent and Trademark Office*